(12) United States Patent
Liu et al.

(10) Patent No.: US 9,493,671 B2
(45) Date of Patent: Nov. 15, 2016

(54) UV CURED VARNISH AND PROCESS FOR PREPARING THE SAME

(71) Applicant: BOE TECHNOLOGY GROUP CO., LTD., Beijing (CN)

(72) Inventors: Lu Liu, Beijing (CN); Jianshe Xue, Beijing (CN); Guanbao Hui, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 187 days.

(21) Appl. No.: 14/348,655

(22) PCT Filed: Aug. 15, 2013

(86) PCT No.: PCT/CN2013/081552
§ 371 (c)(1),
(2) Date: Mar. 31, 2014

(87) PCT Pub. No.: WO2014/153913
PCT Pub. Date: Oct. 2, 2014

(65) Prior Publication Data
US 2015/0225597 A1      Aug. 13, 2015

(30) Foreign Application Priority Data

Mar. 28, 2013   (CN) .......................... 2013 1 0103664

(51) Int. Cl.
| | | |
|---|---|---|
| C09D 133/14 | (2006.01) | |
| C09D 4/06 | (2006.01) | |
| C09D 7/12 | (2006.01) | |
| C09D 163/10 | (2006.01) | |
| C09D 175/14 | (2006.01) | |
| C08L 75/04 | (2006.01) | |
| C08F 220/22 | (2006.01) | |
| C08F 230/08 | (2006.01) | |

(52) U.S. Cl.
CPC .......... *C09D 133/14* (2013.01); *C08F 220/22* (2013.01); *C08F 230/08* (2013.01); *C08L 75/04* (2013.01); *C09D 4/06* (2013.01); *C09D 7/12* (2013.01); *C09D 163/10* (2013.01); *C09D 175/14* (2013.01)

(58) Field of Classification Search
CPC ................ C09D 5/4111; C09D 5/4415; C09D 163/10
See application file for complete search history.

(56) References Cited

U.S. PATENT DOCUMENTS

| | | | | |
|---|---|---|---|---|
| 6,162,553 | A  * | 12/2000 | Ercoli | .................... C09K 11/02 250/483.1 |
| 2004/0225039 | A1* | 11/2004 | Hackbarth | .......... C08F 290/061 524/115 |
| 2010/0271699 | A1* | 10/2010 | Chang | .................... C09D 5/006 359/485.01 |
| 2011/0250415 | A1* | 10/2011 | Kim | .................... C08F 283/008 428/216 |

FOREIGN PATENT DOCUMENTS

| | | |
|---|---|---|
| CN | 101348655 A | 1/2009 |
| CN | 101519479 A | 9/2009 |
| CN | 102964969 A | 3/2013 |
| CN | 103146291 A | 6/2013 |

OTHER PUBLICATIONS

International Search Report mailed Feb. 1, 2014; PCT/CN2013/081552.
First Chinese Office Action Appln. No. 201310103664.6; Dated Sep. 28, 2014.
Chinese Notice of Allowance dated Dec. 11, 2014; Appln. No. 201310103664.6.
International Preliminary Report on Patentability Appln. No. PCT/CN2013/081552; Dated Sep. 29, 2015.

* cited by examiner

*Primary Examiner* — Sanza McClendon
(74) *Attorney, Agent, or Firm* — Ladas & Parry LLP

(57) ABSTRACT

A UV cured varnish, and a process for preparing the same, said UV cured varnish including an epoxy acrylic resin, a polyurethane acrylic resin, a polymerizable monomer, a filler, a photoinitiator, and an adjuvant, wherein the polymerizable monomer comprises a fluorine containing polymerizable monomer and a silicon containing polymerizable monomer. The UV cured varnish can significantly improve the film forming performance. The formed film has a significantly improved performance including hardness, perspiration resistance. The UV cured varnish thus obtained is especially suitable for touch screen and can greatly extend the life of the touch screen.

15 Claims, No Drawings

UV CURED VARNISH AND PROCESS FOR PREPARING THE SAME

FIELD OF INVENTION

The embodiment of the invention relates to a UV cured varnish, and a process for preparing the same.

BACKGROUND OF INVENTION

With the continuous development of electronic techniques, the touch screen has found more and more use in electronic devices such as a cellular phone, Pad, an electronic paper, an automatic transaction machine, and the like. Different from the traditional push-button or keyboard input, touch screen input utilizes direct contact of a tool or a finger with the touch screen to achieve the objective of information input. Especially with the development of capacitive touch screen, the application of hand touch input becomes wider and wider. Therefore, how to extend the life of the touch screen has attracted wider attention.

A common method for extending the life of the touch screen is to coat an insulation coating on the surface of the touch screen which prevents the finger from directly contacting the screen body that generates electronic signal, thereby extending the life of the touch screen. A commonly used insulation coating is a group of UV cured transparent varnishes. Current UV cured varnishes utilize polymerizable monomers which are methacrylates comprising no fluorine and silicon. The coating thus obtained does not have optimal performance such as in hardness, stain resistance, water resistance or the like. In order to overcome the deficiency of the existing UV cured varnishes in performance of the coating formed therefrom, the embodiments of the invention provide an improved cured varnish, and a process for preparing the same.

SUMMARY OF INVENTION

An embodiment of the invention provides a UV cured varnish, which comprises, in part by weight, 20-40 parts of an epoxy acrylic resin, 10-25 parts of a polyurethane acrylic resin, 5-30 parts of a polymerizable monomer, 10-30 parts of a filler, 1-6 parts of a photoinitiator, and 5-10 parts of an adjuvant, wherein the polymerizable monomer comprises, by weight, 10-90% of an acrylate and/or methacrylate monomer, 3-70% of a fluorine containing polymerizable monomer, 1-65% of a silicon containing polymerizable monomer.

For example, the polymerizable monomer comprises, by weight, 35-70% of the acrylate and/or methacrylate monomer, 20-45% of the fluorine containing polymerizable monomer, 10-25% of the silicon containing polymerizable monomer.

For example, the UV cured varnish comprises, in part by weight, 20-35 parts of the epoxy acrylic resin, 10-20 parts of the polyurethane acrylic resin, 20-30 parts of the polymerizable monomer, 20-25 parts of the filler, 3-5 parts of the photoinitiator and 5-10 parts of the adjuvant.

In the aforesaid UV cured varnish, the fluorine containing polymerizable monomer may be selected from one or more of perfluoroalkyl ethyl acrylate, ,1,2,2-tetrohydroperfluorodecyl methacrylate, hexafluorobutyl acrylate, hexafluorobutyl methacrylate, 2,2,2-trifluoroethyl methacrylate, dodecafluoroheptyl methacrylate, dodecafluoroheptyl acrylate, tridecafluorooctyl methacrylate, and tridecafluorooctyl acrylate.

In the aforesaid UV cured varnish, the silicon containing polymerizable monomer may be selected from trimethylsilyl methacrylate and/or 3-trimethoxysilylpropyl methacrylate.

In the aforesaid UV cured varnish, the acrylate and/or methacrylate monomer may be selected from one or more of methyl acrylate, methyl methacrylate, trimethylolpropane triacrylate, isobornyl acrylate, dipropylene glycol diacrylate, dipentaerythritol hexaacrylate and 1,6-hexylene glycol diacrylate.

In the aforesaid UV cured varnish, the filler may be selected from one or more of barium sulfate, talc powder, extinction powder, organic bentonite, gaseous silicon oxide, ground calcium carbonate and light calcium carbonate.

In the aforesaid UV cured varnish, the photoinitiator may be selected from one or more of 2,4,6-trimethylbenzoyl-diphenylphosphine oxide, ethyl 2,4,6-trimethylbenzoylphenylphosphonate, 2-hydroxyl-2-methyl-1-phenyl-1-acetone, 1-hydroxyl-cyclohexyl-phenylketone and 2,2-dimethoxy-2-phenylacetophenone.

In the aforesaid UV cured varnish, the adjuvant may be selected from one or more of a leveling agent, a dispersing agent and an anti-foaming agent.

For example, the adjuvant may comprise, by weight, 25-70% of the leveling agent, 15-55% of the dispersing agent, and 5-40% of the anti-foaming agent.

In the aforesaid UV cured varnish, the epoxy acrylic resin may be selected from one or more of modified or unmodified bisphenol A epoxy acrylic resin, modified or unmodified phenol-formaldehyde epoxy acrylic resin, and modified or unmodified epoxy acrylate resin.

An embodiment of the invention provides a process for preparing the aforesaid UV cured varnish, comprising thoroughly mixing an epoxy acrylic resin, a polyurethane acrylic resin, a polymerizable monomer, a filler, a photoinitiator and, an adjuvant, followed by grinding, and adding a diluting monomer to achieve a desired viscosity.

The diluting monomer may be selected from one or more of methyl acrylate, methyl methacrylate, trimethylolpropane triacrylate, isobornyl acrylate, dipropylene glycol diacrylate, dipentaerythritol hexaacrylate and 1,6-hexylene glycol diacrylate.

DETAILED DESCRIPTION OF INVENTION

The following embodiments are used to illustrate the invention, not intended to limit the scope of the invention. Unless specified otherwise, it will be understood that the reagents used are conventional commercial reagents or those synthesized by the existing techniques. Unless specified otherwise, it will be understood that the manipulations used are conventional manipulations in the art. It is obvious that the embodiments described are merely some embodiments, rather than all embodiments of the invention. Based on the embodiments of the invention, all other embodiments obtainede by a person of ordinary skill in the art without resorting to inventive work will fall into the scope of the invention.

An embodiment of the invention provides a UV cured varnish which comprises, in part by weight, 20-40 parts of an epoxy acrylic resin, 10-25 parts of a polyurethane acrylic resin, 5-30 parts of a polymerizable monomer, 10-30 parts of a filler, 1-6 parts of a photoinitiator, and 5-10 parts of an adjuvant;

wherein the polymerizable monomer comprises, by weight, 10-90% of an acrylate and/or methacrylate monomer, 3-70% of a fluorine containing polymerizable monomer, and 1-65% of a silicon containing polymerizable monomer.

In the UV cured varnish provided by the embodiment of the invention, the polymerizable monomer may consists of a (methyl)acrylate monomer, a fluorine containing polymerizable monomer, and a silicon containing polymerizable monomer. Because F has a high electronegativity, the C—F bond in the fluorine containing polymerizable monomer has a greater single bond energy, shorter bond length, more resistance to decomposition upon heating, and better heat resistance as compared to other single bonds formed between carbon and other atoms. Moreover, the C—F bond has strong rigidity, which provides an excellent hardness for the film layer formed, thereby resulting in an excellent resistance to scratch. The (methyl)acrylate monomers can improve the flexibility of the film layer formed and increase its toughness to avoid bubbles and cracks to occur. The silicon containing polymerizable monomer can reduce the surface tension of the film layer. The Si—O bond has good flexibility, together with the rigid C—F bond, allows the film layer to have excellent adhesion while providing the excellent resistance to scratch, resulting in the film layer not liable to shedding.

For example, the polymerizable monomer comprises, by weight, 35-70% of the acrylate and/or methacrylate monomer, 20-45% of the fluorine containing polymerizable monomer, 10-25% of the silicon containing polymerizable monomer.

For example, the UV cured varnish comprises, in part by weight, 20-35 parts of the epoxy acrylic resin, 10-20 parts of the polyurethane acrylic resin, 20-30 parts of the polymerizable monomer, 20-25 parts of the filler, 3-5 parts of the photoinitiator, and 5-10 parts of the adjuvant.

In aforesaid UV cured varnish, the fluorine containing polymerizable monomer, for example, may be a fluorine containing acrylate and/or a fluorine containing methacrylate, for example, a perfluoroalkyl acrylate and/or a perfluoroalkyl methacrylate, wherein the perfluoroalkyl moiety has 1-15 carbon numbers. For example, the fluorine containing polymerizable monomer may be selected from one or more of perfluoroalkyl ethyl acrylate, 1,1,2,2-tetrahydroperfluorodecylmethacrylate, hexafluorobutyl acrylate, hexafluorobutyl methacrylate, 2,2,2-trifluoroethyl methacrylate, dodecafluoroheptyl methacrylate, dodecafluoroheptyl acrylate, tridecafluorooctyl methacrylate, and tridecafluorooctyl acrylate.

In aforesaid UV cured varnish, the silicon containing polymerizable monomer may, for example, be a silicon containing acrylate and/or a silicon containing methacrylate. For example, it may be selected from trimethylsilyl methacrylate and/or 3-trimethoxysilylpropyl methacrylate.

In aforesaid UV cured varnish, the acrylate and/or methacrylate monomer may be selected from any monomer used in the existing UV cured varnish. For example, it may be selected from one or more of methyl acrylate (MA), methyl methacrylate (MMA), trimethylolpropane triacrylate (TMPTA), isobornyl acrylate (IOBA), dipropylene glycol diacrylate (DPGDA), dipentaerythritol hexaacrylate (DPHA), and 1,6-hexylene glycol diacrylate (HDDA).

In aforesaid UV cured varnish, the filler may be selected from any filler used in the existing UV cured varnish. For example, it may be selected from one or more of barium sulfate, talc powder, extinction powder, organic bentonite, gaseous silicon oxide, ground calcium carbonate, and light calcium carbonate. For example, the filler may be a mixture of barium sulfate, talc powder, extinction powder, and gaseous silicon oxide in any ratio. For example, the filler may comprise, by weight, 30-50% of barium sulfate, 20-30% of talc powder, 10-15% of gaseous silicon oxide as well as 20-35% of extinction powder. In aforesaid UV cured varnish, the photoinitiator may be selected from any photoinitiator used in the existing UV cured varnish photoinitiator. For example, it may be selected from one or more of 2,4,6,-trimethylbenzoyl-diphenylphosphine oxide (TPO), ethyl 2,4,6-trimethylbenzoylphenyl phosphonate (TPO-L), 2-hydroxyl-2-methyl-1-phenyl-1-acetone (1173), 1-hydroxyl-cyclohexyl-phenylketone (184), 2,2-dimethoxy-2-phenylacetophenone (BDK).

In aforesaid UV cured varnish, the adjuvant may be selected from one or more of a leveling agent, a dispersing agent, and an anti-foaming agent.

For example, the adjuvant may comprise, by weight, 25-70% of a leveling agent, 15-55% of a dispersing agent, and 5-40% of an anti-foaming agent. For example, the adjuvant may comprise, by weight, 40-60% of the leveling agent, 10-30% of the dispersing agent, and 25-40% of the anti-foaming agent.

In the aforesaid adjuvants, the leveling agent may be selected from any one of the commercial reagents in the art, such as BYK-300, BYK-306, BYK-307, BYK-310, BYK-315, BYK-320, BYK-323, BYK-325, BYK-331, and the like.

In the aforesaid adjuvants, the dispersing agent may be selected from any one of the commercial reagents in the art, such as BYK-P104S, BYK-P104, BYK-101, BYK-103, BYK-107, BYK-108, BYK-1 10, BYK-111, BYK-161, and the like.

In the aforesaid adjuvants, the anti-foaming agent may be selected from any one of the commercial reagents in the art, such as BYK-141, BYK-A530, BYK-020, BYK-022, BYK-024, BYK-028, BYK-034, BYK-052, BYK-053, BYK-055, BYK-057, and the like. In the aforesaid UV cured varnish, the epoxy acrylic resin may be selected from one or more of modified or unmodified bisphenol A epoxy acrylic resin, modified or unmodified phenol-formaldehyde epoxy acrylic resin, and modified or unmodified epoxy acrylate resin.

The modified epoxy acrylic resin may be any modified resin present in the art, for example, a modified bisphenol A epoxy acrylic resin EBECRYL 954, EBECRYL 3420, EBECRYL 3703, and the like; an epoxidized soybean oil acrylic resin EBECRYL 860; a modified epoxy acrylate 6210G, 623A-80, and the like.

The UV cured varnish of the embodiment of the invention may be prepared using any process for preparing such varnish in the art. For example, the process of preparation may comprise: thoroughly mixing the epoxy acrylic resin, the polyurethane acrylic resin, the polymerizable monomer, the filler, the photoinitiator and the adjuvant, followed by grinding, and finally adding a diluting monomer to achieve a desired viscosity.

For example, the fineness for grinding is 10 μm or lower.

For example, the aforesaid process of preparation may comprise the following steps:

(1) mixing thoroughly the photoinitiator and the polymerizable monomer;

(2) agitating the mixture obtained from the step (1) with the epoxy acrylic resin, the polyurethane acrylic resin, the filler, and the adjuvant in a high speed mixer until homogeneously mixed;

(3) grinding the mixture obtained from the step (2) in a grinder until the fineness is less than 10 μm; and (4) adding a diluting monomer to the mixture obtained from the step (3) to achieve a desired viscosity, wherein the level of the diluting monomer added is determined by the desired viscosity of the varnish to be prepared. For example, the viscosity may be 10-25 P for roller coating, and may be 50-100 P for screen printing.

The diluting monomer may be selected from one or more of methyl acrylate, methyl methacrylate, trimethylolpropane triacrylate, isobornyl acrylate, dipropylene glycol diacrylate, dipentaerythritol hexaacrylate, 1,6-hexylene glycol diacrylate.

The substrate on which the UV cured varnish of the embodiments of the invention may be coated includes, but is not limited to, ordinary optical glass, FTP glass, ITO ceramic, and the like.

The irradiation device useful for curing the UV cured varnish of the invention includes, but is not limited to low pressure, medium pressure, or high pressure mercury lamps, LED light sources, or other devices that can emit UV light, preferably a high pressure mercury lamp. The wavelength of the UV light emitting from the irradiation device is in the range of 200-400 nm. The irradiation energy (using the irradiation energy at a wavelength $\lambda=365$ nm as the reference standard) is in the range of 400-1800 mJ/cm$^2$, preferably 500-1200 mJ/cm$^2$, and more preferably 600-800 mJ/cm$^2$.

The UV cured varnish provided by the embodiments of the invention has an improved film forming performance due to the incorporation of the silicon containing polymerizable monomer and the fluorine containing polymerizable monomer. As compared to the existing UV varnish, the present UV cured varnish has significant improvements in hardness, water resistance, stain resistance, perspiration resistance, and the like after the formation of film. Therefore, it is especially suitable for the touch screen and can greatly extend its life. The process for preparing the UV cured varnish of the invention has simple process conditions, convenient manipulations, and is suitable for large-scale industrialized production.

In order to better illustrate the aforesaid UV cured varnish, and a process for preparing the same, several specific examples are provided below. It will be understood that these examples are merely illustrative, not intended to limit the scope of the invention.

The methods for testing performance used in the following examples are described as follows.

(1) Hardness: the core of a 6B-9H pencil (Mitsubishi) is cut into a cylinder and abraded to smoothness on 400 mesh sand paper, and then fit into a specific pencil hardness testing device (the load on the tip of the pencil is 1 kg, the angle between the pencil and a horizontal plane is 45°), followed by pushing the pencil to slide forward about 5 mm. A total of 5 pencil marks are obtained, and each of them is wiped off with a rubber eraser. The surface of the coating will be checked for scratches. The hardness where there is less than one scratch is measured as the hardness of the coating.

(2) Adhesion: 10×10 small grids in 1 mm×1 mm are cut on the surface of the test sample using a sharp blade (angle of the blade is 15°-30°). Each cutting line will be deep enough to reach the bottom layer of the paint. Debris in the test region is cleaned by a brush. The small grids to be tested are firmly adhered with a tape (3M810) having an adhesion force of 350-400 g/cm$^2$, and a rubber eraser is used to scrub the tape so as to increase the contact area and intensity of the tape with the test region. The tape is quickly torn off in the vertical direction (90°) with hand grasping one end of the tape. Two duplicate tests are conducted at each position.

(3) Perspiration Resistance

1. The formula for artificial sweat comprises 100 ml deionized water+5 g NaCl+5 g Na$_2$HPO$_4$+2 ml 99% of acetic acid (by weight) with a pH of about 4.7.

2. Test conditions: under 45° C., the sample is covered with a cotton towel soaked with sweat. The towel is kept humid. The surface is detected to see if any change occurs (the sample can not be soaked directly in sweat) every 24 hours, for a total 120 hours (5 days). The water stain on the surface of the test sample is wiped off with a dry cloth, followed by standing under ambient temperature for half an hour. The product which does not appear to have any crack, bubble, and peeling off will be identified as a qualified one.

EXAMPLE 1

3 parts of photoinitiator 184, 15 parts of trimethylolpropane triacrylate (TMPTA), 7 parts of perfluoroalkyl ethyl acrylate, and 4 parts of trimethylsilyl methacrylate were weighed. First, the aforesaid components were added to a high speed mixer and mixed homogenously. Then 20 parts of a epoxy acrylic resin (CN UVE151NS, Sartomer Shanghai), 20 parts of a polyurethane acrylic resin (WDS2210, Wuxi Weidusi electronic), 12 parts of barium sulfate, 5 parts of talc powder, 3 parts of gaseous silicon oxide, 5 parts of extinction powder, 3 parts of the leveling agent BYK-300, 1 part of the anti-foaming agent BYK-A530, and 2 parts of the dispersing agent BYK-P104S were added and continuously agitated until thoroughly mixed. Then the resulting mixture was ground with a three-roll grinder to a fineness of less than 10 μm. TMPTA was added to adjust the viscosity to 100 P, and the resulting product was printed to an ordinary optical glass substrate using a 200 mesh screen, and cured under a high pressure mercury lamp at an energy of 600 mJ/cm$^2$.

The results of the performance test were as follows:
Hardness: 6H;
Adhesion (Cross-cut method): 100/100;
Distinction (60° angle): 17-21/31.6 Gs;
Resistance to water-boiling (100° C.×60 min): qualified (no crack, no bubble, no peeling off);
Resistance to high temperature (265° C.×10 seconds×3 times): qualified (no crack, no bubble and no peeling off);
Resistance to sweat: qualified (no crack, no bubble and no peeling off);
Resistance to fingerprint: no significant fingerprint under visual inspection;
Thermal shocking: (80° C.±2° C.×40 min, −40° C.±2° C.×40 min): qualified (no crack, no bubble and no peeling off).

EXAMPLE 2

5 parts of photoinitiator 184, 8 parts of TMPTA, 6 parts of hexafluorobutyl methacrylate, and 3 parts of trimethylsilyl methacrylate were weighed. First, the aforesaid components were added to a high speed mixer and mixed homogenously. Then 30 parts of an epoxy acrylic resin (DM1636, Double Bond Chemical, Taiwan), 15 parts of a polyurethane acrylic resin (WDS2210, Wuxi Weidusi electronic), 11 parts of barium sulfate, 5 parts of talc powder, 3 parts of gaseous silicon oxide, 5 parts of extinction powder, 3 parts of the leveling agent BYK-307, 1 part of the anti-foaming agent BYK-020, and 2 parts of the dispersing agent BYK-101 were added and continuously agitated until thoroughly mixed. Then the resulting mixture was ground with a three-roll grinder to a fineness of less than 10 μm. TMPTA was added to adjust the viscosity to 100 P, and the resulting product was printed to an ordinary optical glass substrate using a 200 mesh screen, and cured under a high pressure mercury lamp at an energy of 800 mJ/cm².

The results of the performance test were as follows:
Hardness: 6H;
Adhesion (Cross-cut method): 98/100;
Distinction (60° angle): 16-20/31.6;
Resistance to water-boiling (100° C.×60 min): qualified (no crack, no bubble, no peeling off);
Resistance to high temperature (265° C.×10 seconds×3 times): qualified (no crack, no bubble and no peeling off);
Resistance to sweat: qualified (no crack, no bubble and no peeling off);
Resistance to fingerprint: no significant fingerprint under visual inspection;
Thermal shocking: (80° C.±2° C.×40 min, −40° C.±2° C.×40 min): qualified (no crack, no bubble and no peeling off).

EXAMPLE 3

5 parts of photoinitiator 184, 17 parts of dipentaerythritol hexaacrylate (DPHA), 5 parts of 2,2,2-trifluoroethyl methacrylate, and 3 parts of trimethylsilyl methacrylate were weighed. First, the aforesaid components were added to a high speed mixer and mixed homogenously. Then 25 parts of a epoxy acrylic resin (CN UVE151NS, Sartomer Shanghai), 15 parts of a polyurethane acrylic resin (WDS3532, Wuxi Weidusi electronic), 8 parts of barium sulfate, 5 parts of talc powder, 3 parts of gaseous silicon oxide, 8 parts of extinction powder, 3 parts of the leveling agent BYK-331, 1 part of the anti-foaming agent BYK-022, and 2 parts of the dispersing agent BYK-107 were added and continuously agitated until thoroughly mixed. Then the resulting mixture was ground with a three-roll grinder to a fineness of less than 10 μm. TMPTA was added to adjust the viscosity to 100 P, and the resulting product was printed to an ordinary optical glass substrate using a 200 mesh screen, and cured under a high pressure mercury lamp at an energy of 800 mJ/cm².

The results of the performance test were as follows:
Hardness: 6H;
Adhesion (Cross-cut method): 99/100;
Distinction (60° angle): 13-15/31.6;
Resistance to water-boiling (100° C.×60 min): qualified (no crack, no bubble, no peeling off);
Resistance to high temperature (265° C.×10 seconds×3 times): qualified (no crack, no bubble and no peeling off);
Resistance to sweat: qualified (no crack, no bubble and no peeling off);
Resistance to fingerprint: no significant fingerprint under visual inspection.

EXAMPLE 4

5 parts of photoinitiator 184, 7 parts of DPHA, 9 parts of tridecafluorooctyl methacrylate, and 4 parts of trimethylsilyl methacrylate were weighed. First, the aforesaid components were added to a high speed mixer and mixed homogenously. Then 35 parts of a modified epoxy acrylate 6210G, 10 parts of a polyurethane acrylic resin (WDS2213, Wuxi Weidusi electronic), 8 parts of barium sulfate, 5 parts of talc powder, 3 parts of gaseous silicon oxide, 5 parts of extinction powder, 3 parts of the leveling agent BYK-315, 1 part of the anti-foaming agent BYK-052, and 2 parts of the dispersing agent BYK-110 were added and continuously agitated until thoroughly mixed. Then the resulting mixture was ground with a three-roll grinder to a fineness of less than 10 μm. A mixture of monomers of DPHA and TMPTA (DPHA:TMPTA=3:1) was added to adjust the viscosity to 100 P, and the resulting product was printed to an ordinary optical glass substrate using a 200 mesh screen, and cured under a high pressure mercury lamp at an energy of 800 mJ/cm².

The results of the performance test were as follows:
Hardness: 7H;
Adhesion (Cross-cut method): 100/100;
Distinction (60° angle): 12-15/31.6;
Resistance to water-boiling (100° C.×60 min): qualified (no crack, no bubble, no peeling off);
Resistance to high temperature (265° C.×10 seconds×3 times): qualified (no crack, no bubble and no peeling off);
Resistance to sweat: qualified (no crack, no bubble and no peeling off);
Resistance to fingerprint: no significant fingerprint under visual inspection;
Thermal shocking: (80° C.±2° C.×40 min, −40° C.±2° C.×40 min): qualified (no crack, no bubble and no peeling off).

EXAMPLE 5

3 parts of photoinitiator 184, 1 part of the photo initiator 2,4,6,-trimethylbenzoyl-diphenylphosphine oxide (TPO), 10 parts of TMPTA, 7 parts of dodecafluoroheptyl acrylate, and 5 parts of 3-trimethoxysilylpropyl methacrylate were weighed. First, the aforesaid components were added to a high speed mixer and mixed homogenously. Then 35 parts of a modified bisphenol A epoxy acrylic resin EBECRYL 954, 10 parts of a polyurethane acrylic resin (WDS2213, Wuxi Weidusi electronic), 7 parts of barium sulfate, 5 parts of talc powder, 2 parts of gaseous silicon oxide, 8 parts of extinction powder, 3 parts of the leveling agent BYK-300, 1 part of the anti-foaming agent BYK-028, and 3 parts of the dispersing agent BYK-103 were added and continuously agitated until thoroughly mixed. Then the resulting mixture was ground with a three-roll grinder to a fineness of less than 10 pm. A mixture of DPHA, TMPTA, and DPGDA monomers (DPHA:TMPTA: DPGDA=5:10:7) was added to adjust the viscosity to 10 P, and the resulting product was printed to an ordinary optical glass substrate using an offset printer, and cured under a high pressure mercury lamp at an energy of 600 mJ/cm².

The results of the performance test were as follows:
Hardness: 6H;
Adhesion (Cross-cut method): 100/100;
Distinction (60° angle): 18-23/31.6;
Resistance to water-boiling (100° C.×60 min): qualified (no crack, no bubble, no peeling off);
Resistance to high temperature (265° C.×10 seconds×3 times): qualified (no crack, no bubble and no peeling off);
Resistance to sweat: qualified (no crack, no bubble and no peeling off);
Resistance to fingerprint: no significant fingerprint under visual inspection;
Thermal shocking: (80° C.±2° C.×40 min, −40° C.±2° C.×40 min): qualified (no crack, no bubble and no peeling off).

Comparative Example 1

Except that the same parts of TMPTA monomer is used to replace the fluorine containing polymerizable monomer and the silicon containing polymerizable monomer, the raw materials and the process of preparation are the same as in Example 1.

The results of the performance test were as follows:
Hardness: 5H;
Adhesion (Cross-cut method): 94/100;
Distinction (60° angle): 16-20/31.6;
Resistance to water-boiling (100° C.×60 min): qualified (no crack, no bubble, no peeling off);
Resistance to high temperature (265° C.×10 seconds×3 times): not qualified (crack(s), no bubble and no peeling off);
Resistance to sweat: not qualified (crack(s), no bubble and no peeling off);
Resistance to fingerprint: no significant fingerprint under visual inspection;
Thermal shocking: (80° C.±2° C.×40 min, −40° C.±2° C.×40 min): not qualified (crack(s), bubbling, and no peeling off).

As can be seen from the aforesaid examples and comparative example, by adding a fluorine containing polymerizable monomer and a silicon containing polymerizable monomer into the UV cured varnish, the performance of the film formed such as hardness, adhesion, and the like can be improved. Moreover, performance such as resistance to sweat and thermal shocking can be improved. Therefore, the UV cured varnish thus obtained is especially suitable for the touch screen and can greatly extend the life of the screen.

Although the invention is described in details using general illustration and specific embodiments, it is obvious to a person skilled in the art to make modifications or improvement on the basis of the invention. Therefore, all these modifications or improvements made without departing from the spirits of the invention will fall into the scope of the invention.

The invention claimed is:

1. A UV cured varnish, which comprises, in part by weight, 20-40 parts of an epoxy acrylic resin, 10-25 parts of a polyurethane acrylic resin, 5-30 parts of a polymerizable monomer, 10-30 parts of a filler, 1-6 parts of a photoinitiator, and 5-10 parts of an adjuvant,
wherein the polymerizable monomer comprises, by weight, 35-70% of an acrylate and/or methacrylate monomer, 20-45% of a fluorine containing polymerizable monomer, and 10-25% of a silicon containing polymerizable monomer; and the silicon containing polymerizable monomer is selected from trimethylsilyl methacrylate and/or 3-trimethoxysilylpropyl methacrylate.

2. The UV cured varnish according to claim 1, wherein the UV cured varnish comprises, in part by weight, 20-35 parts of the epoxy acrylic resin, 10-20 parts of the polyurethane acrylic resin, 20-30 parts of the polymerizable monomer, 20-25 parts of the filler, 3-5 parts of the photoinitiator, and 5-10 parts of the adjuvant.

3. The UV cured varnish according to claim 1, wherein the fluorine containing polymerizable monomer is selected from one or more of perfluoroalkyl ethyl acrylate, 1,1,2,2-tetrohydroperfluorodecylmethacrylate, hexafluorobutyl acrylate, hexafluorobutyl methacrylate, 2,2,2-trifluoroethyl methacrylate, dodecafluoroheptyl methacrylate, dodecafluoroheptyl acrylate, tridecafluorooctyl methacrylate and tridecafluorooctyl acrylate.

4. The UV cured varnish according to claim 1, wherein the acrylate and/or methacrylate monomer is selected from one or more of methyl acrylate, methyl methacrylate, tri methylolpropane triacrylate, isobornyl acrylate, dipropylene glycol diacrylate, dipentaerythritol hexaacrylate, and 1,6-hexylene glycol diacrylate.

5. The UV cured varnish according to claim 1, wherein the filler is selected from one or more of barium sulfate, talc powder, extinction powder, organic bentonite, gaseous silicon oxide, ground calcium carbonate, and light calcium carbonate.

6. The UV cured varnish according to claim 2, wherein the filler is selected from one or more of barium sulfate, talc powder, extinction powder, organic bentonite, gaseous silicon oxide, ground calcium carbonate, and light calcium carbonate.

7. The UV cured varnish according to claim 1, wherein the photoinitiator is selected from one or more of 2,4,6,-trimethylbenzoyl-diphenylphosphine oxide, ethyl 2,4,6-trimethylbenzoylphenyl phosphonate, 2-hydroxy-2-methyl-1-phenyl-1-acetone, 1-hydroxyl-cyclohexyl-phenylketone, and 2,2-dimethoxy-2-phenylacetophenone.

8. The UV cured varnish according to claim 2, wherein the photoinitiator is selected from one or more of 2,4,6,-trimethylbenzoyl-diphenylphosphine oxide, ethyl 2,4,6-trimethylbenzoylphenyl phosphonate, 2-hydroxy-2-methyl-1-phenyl-1-acetone, 1-hydroxyl-cyclohexyl-phenylketone, and 2,2-dimethoxy-2-phenylacetophenone.

9. The UV cured varnish according to claim 1, wherein the adjuvant is selected from one or more of a leveling agent, a dispersing agent, and an anti-foaming agent.

10. The UV cured varnish according to claim 2, wherein the adjuvant is selected from one or more of a leveling agent, a dispersing agent, and an anti-foaming agent.

11. The UV cured varnish according to claim 9, wherein the adjuvant comprises, by weight, 25-70% of the leveling agent, 15-55% of the dispersing agent, and 5-40% of the anti-foaming agent.

12. The UV cured varnish according to claim 1, wherein the epoxy acrylic resin is selected from one or more of modified or unmodified bisphenol A epoxy acrylic resin, modified or unmodified phenol-formaldehyde epoxy acrylic resin, and modified or unmodified epoxy acrylate resin.

13. The UV cured varnish according to claim 2, wherein the epoxy acrylic resin is selected from one or more of modified or unmodified bisphenol A epoxy acrylic resin, modified or unmodified phenol-formaldehyde epoxy acrylic resin, and modified or unmodified epoxy acrylate resin.

14. A process for preparing the UV cured varnish according to claim 1, comprising thoroughly mixing the epoxy acrylic resin, the polyurethane acrylic resin, the polymerizable monomer, the filler, the photoinitiator, and the adjuvant, followed by grinding, and finally adding a diluting monomer to achieve a desired viscosity.

15. The process for preparing according to claim 14, wherein the diluting monomer is selected from one or more of methyl acrylate, methyl methacrylate, trimethylolpropane triacrylate, isobornyl acrylate, dipropylene glycol diacrylate, dipentaerythritol hexaacrylate, and 1,6-hexylene glycol diacrylate.

* * * * *